United States Patent [19]
Huang

[11] Patent Number: 5,925,306
[45] Date of Patent: Jul. 20, 1999

[54] METHOD OF MANUFACTURING AN AIR CUSHION

[76] Inventor: Ing Chung Huang, No. 218 Cheng Kung Three Road, Nantou City, Taiwan

[21] Appl. No.: 08/876,200

[22] Filed: Jun. 16, 1997

[30] Foreign Application Priority Data

Jun. 15, 1996 [TW] Taiwan ................................. 85107203

[51] Int. Cl.⁶ ............................ B29C 49/04; B29C 49/60
[52] U.S. Cl. .......................... 264/540; 425/536; 425/532
[58] Field of Search .................................... 264/540, 515; 425/525, 532, 536

[56] References Cited

U.S. PATENT DOCUMENTS

| 3,372,429 | 3/1968 | Kato | 264/515 |
| 4,722,131 | 2/1988 | Huang | 264/516 |

FOREIGN PATENT DOCUMENTS

| 750299 | 10/1970 | Belgium | 264/515 |
| 48-9473 | 3/1973 | Japan | 264/515 |
| 51-42144 | 11/1976 | Japan | 264/515 |
| 54-24427 | 8/1979 | Japan | 264/515 |
| 58-124622 | 7/1983 | Japan | 264/515 |
| 62-74623 | 4/1987 | Japan . | |
| 3-65322 | 3/1991 | Japan | 264/515 |
| 3-240517 | 10/1991 | Japan | 264/515 |

Primary Examiner—Catherine Timm
Attorney, Agent, or Firm—Bacon & Thomas

[57] ABSTRACT

An air cushion having smooth exterior surfaces is produced by extruding a material film defined by upper and lower surfaces secured together by a plurality of spaced ribs. The film is clamped between a shaping mold and a needle having a plurality of air holes corresponding to cells defined by the ribs is inserted through the film and a fluid is blown into the cells to form the air cushion.

8 Claims, 4 Drawing Sheets

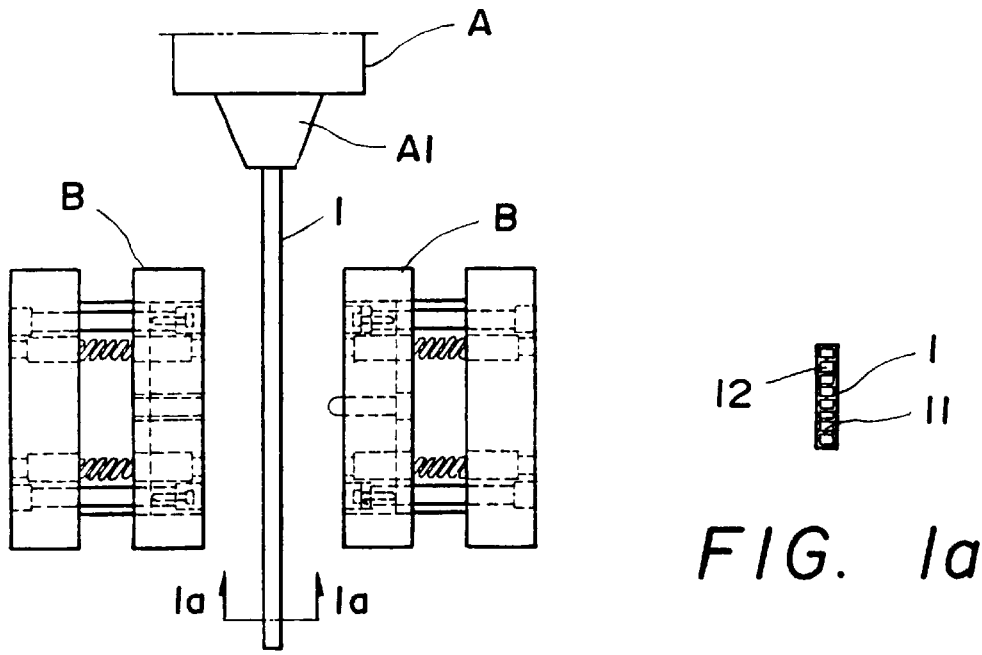
FIG. 1
FIG. 1a
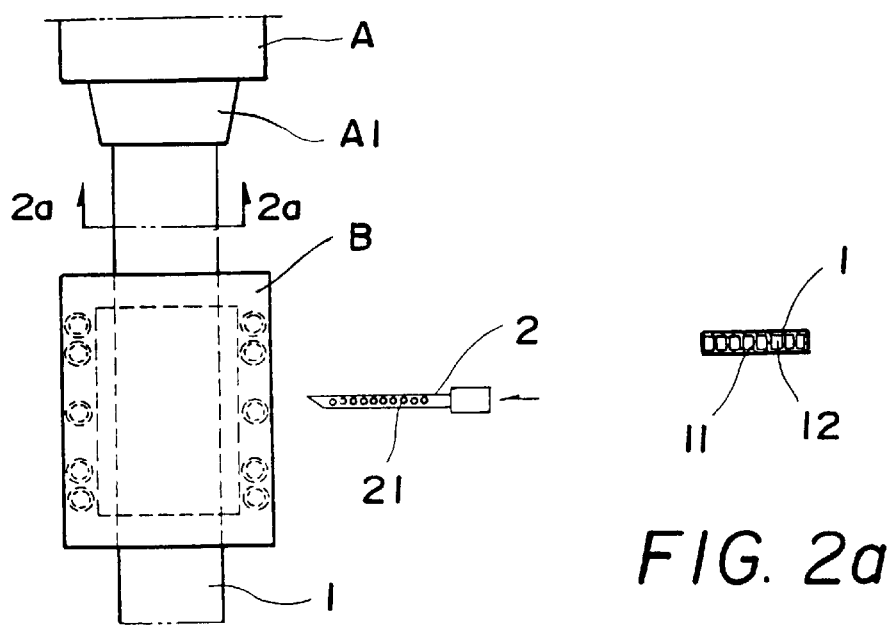
FIG. 2
FIG. 2a

METHOD OF MANUFACTURING AN AIR CUSHION

BACKGROUND OF THE INVENTION

Common air cushions for providing buffering and shock-absorbing functions (adapted to shoes, protective pads, etc.) are manufactured by two methods. One method is traditional, using two sheets sealed with heating and inflated with a gas for producing an inflated bed, a life belt or the like. Another method uses an extrusion blow molding process for producing three dimensional (3D) air cushions provided with a shape memorizing function and with recessed holes or recessed grooves in an upper surface to realize little transformation after inflation and maintain a basic 3D shape supporting structural function after deflation.

However, air cushions produced by the two kinds of methods mentioned above can not have completely smooth exterior surfaces. An air cushion produced by the former method has a swollen middle inflated portion surrounded by a sealed peripheral edge, and an air cushion produced by the latter method has recessed holes or recessed grooves. Thus, air cushions provided with substantially smooth surfaces can not be produced by these two methods.

SUMMARY OF THE INVENTION

The purpose of this invention is to provide a method for manufacturing an air cushion having a completely smooth exterior surface and a 3D shape memorizing structure by an extrusion blow molding process.

One feature of the invention is an extrusion mold and an extruding device for extruding a hollow material film downwardly to be clamped by a shaping mold for forming a 3D air cushion having smooth exterior surfaces.

Another feature of the invention is the hollow film, extruded out of the extrusion mold, being provided with internal ribs between an upper surface and a lower surface for supporting and securing both the surfaces together.

Another feature of the invention is an air needle having a pointed front end, a hollow interior and air holes spaced apart along its body for inserting through the shaping mold and communicating with the cells of the extruded hollow material film, and for a blowing substance, such as gas, blown through the air needle to inflate the air cushion being formed in the shaping mold.

BRIEF DESCRIPTION OF THE DRAWINGS

This invention will be better understood by referring to the accompanying drawings, wherein:

FIG. 1 is a front exploded view of an extrusion and shaping mold assembly used in the present invention;

FIG. 1—1 is a cross-sectional view along line 1—1 in FIG. 1;

FIG. 2 is a side view of the assembly of FIG. 1;

FIG. 2—2 is a cross-sectional view along line 2—2 in FIG. 2;

DETAILED DESCRIPTION OF THE PREFERRED EMBODIMENT

Figure 3:
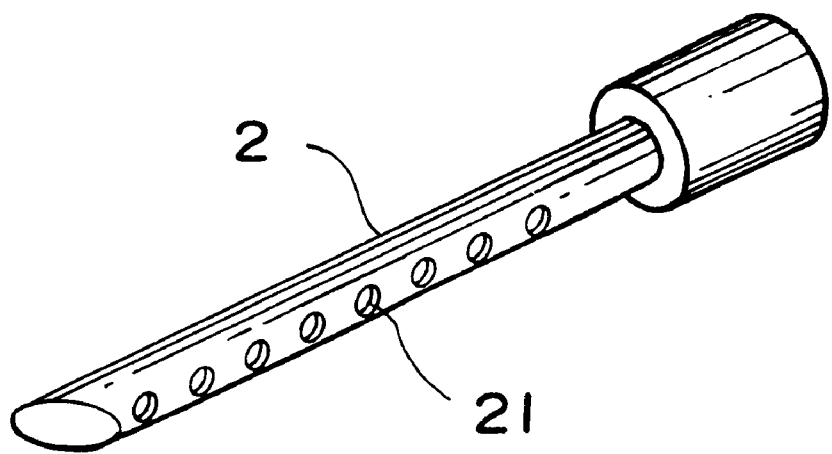
FIG. 3 is a perspective view of an air needle used in the present invention.

A preferred embodiment of a mold assembly used in the method for manufacturing air cushions in the present invention is shown in FIGS. 1, 1—1, 2 and 2—2. A hollow material film 1 is extruded out of an extrusion mold A1 by an extruding device A located on the mold A1 and then clamped by a shaping mold B, with the material film 1 being blown and inflated by a blowing substance, such as a gas, blown through an air needle 2. When the material film is extruded downwardly through the extrusion mold A1, the material film is integrally formed with a plurality of spaced internal ribs 11 defining a plurality of hollow grid cells 12 of any desired geometric shape. Each rib 11 has an upper edge connected with an upper sheet and a lower edge connected with a lower sheet so as to support and secure the upper and the lower sheets in a spaced manner. The ribs 11 can also be arranged to either be connected with each other or not disposed in the same direction.

After the extruding device A extrudes a hollow material film 1 through the extrusion mold A1, the material film 1 is clamped in the shaping mold B, and then an air needle 2 is inserted through the shaping mold B and the material film 1, and air or gas is blown through the air needle 2 to inflate film 1 to form an air cushion having a 3D shape in the shape of mold B.

Figure 4:
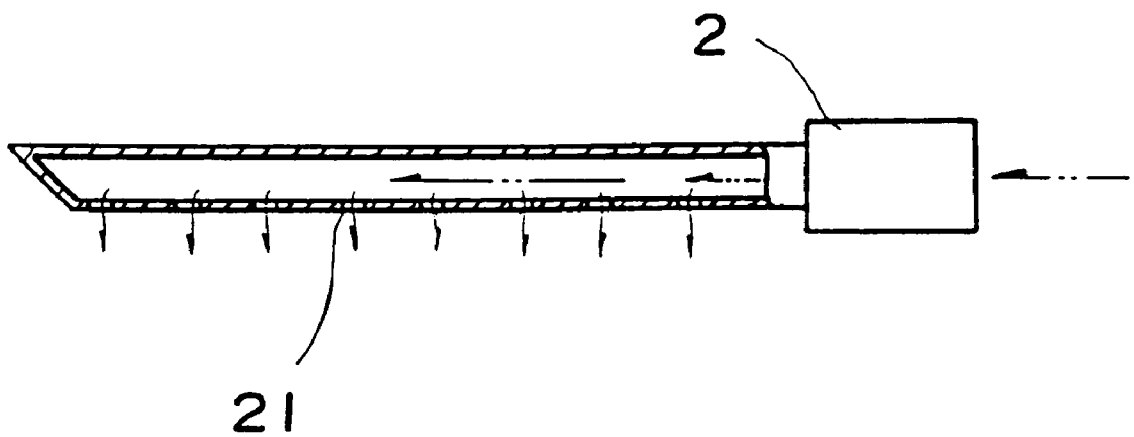
FIG. 4 is a partial cross-sectional view of the air needle.
Figure 6:
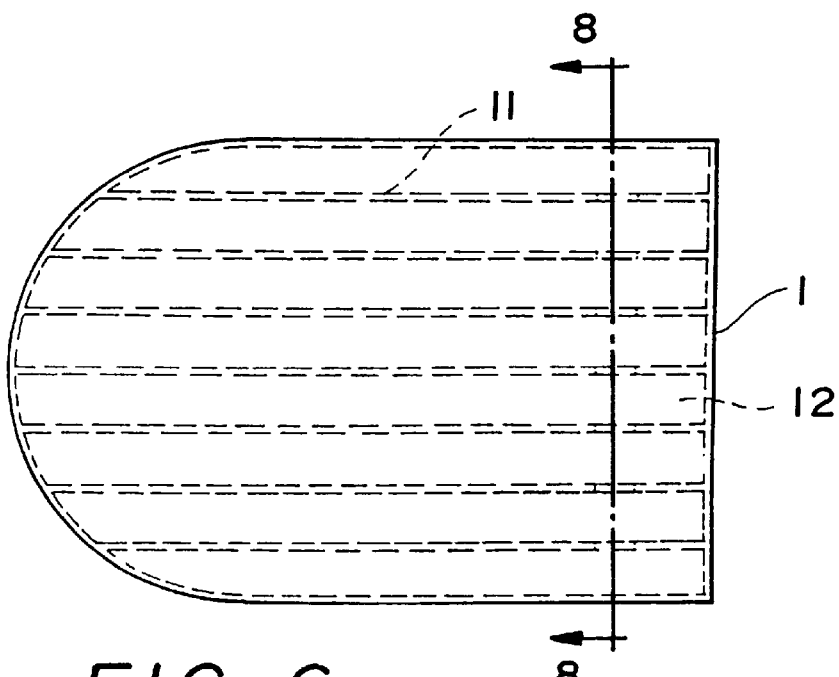
FIG. 6 is a top view of FIG. 5.
Figure 7:
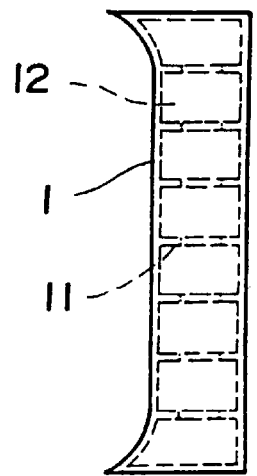
FIG. 7 is a right side view of FIG. 5.

The structure of the air needle 2 is shown in FIGS. 3 and 4, and includes a pointed front end, a hollow interior and one or more air holes 21 spaced apart along its tubular body and corresponding to the cells 12 of film 1 so as to permit a gas blown through needle 2 and into the cells 12 defined by the ribs 11 of material film 1 to form an air cushion. Thus, each air hole 21 of the air needle 2 must be in fluid communication with a respective corresponding cell 12 of the hollow material film 1.

Figure 5:
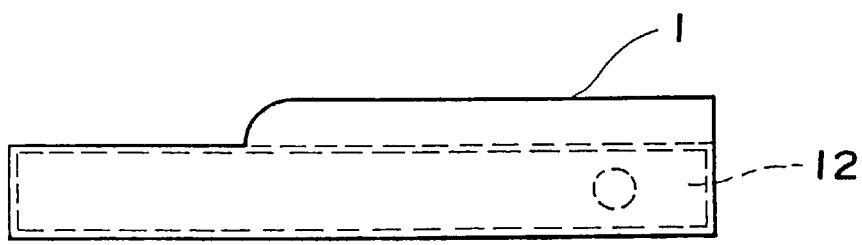
FIG. 5 is a side view of a first preferred embodiment of an air cushion made with the mold assembly in the present invention.
Figure 8:
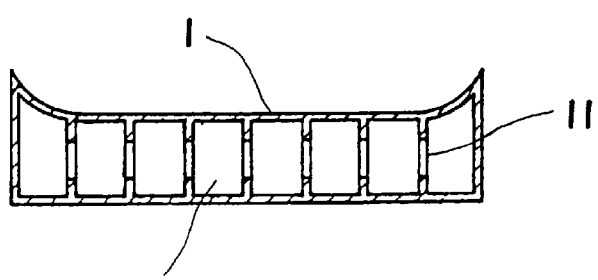
FIG. 8 is a cross-sectional view along line 8—8 in FIG. 6.
Figure 10:
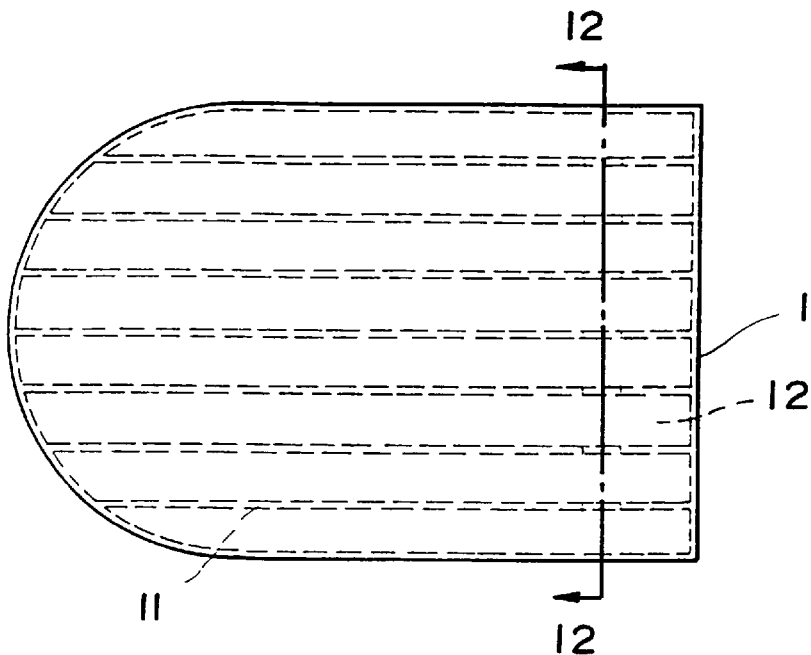
FIG. 10 is a top view of FIG. 9.
Figure 11:
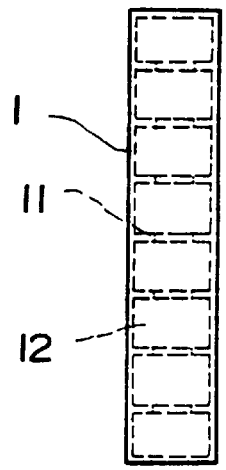
FIG. 11 is a right side view of FIG. 10.
Figure 9:
FIG. 9 is a side view of a second preferred embodiment of an air cushion made with the mold assembly in the present invention.
Figure 12:
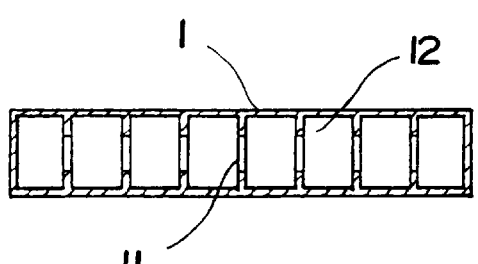
FIG. 12 is a cross-sectional view along line 12—12 in FIG. 10.

In the process of blowing and forming an air cushion, after a gas is blown through the air needle 2 into the hollow material film 1 clamped in the shaping mold B, the air needle 2 is pulled out of the shaping mold B. The air cushion thus formed in the shaping mold B is cooled and taken off the shaping mold B. The cushion has a 3D shape and a flat upper exterior surface with no recessed holes or grooves. In addition, the air cushion can be filled with any appropriate substance, fluid or semi-fluid, such as a gas, a liquid, a foam rubber, a gel, etc. Then the needle holes in the side of the cushion are sealed up and smoothed over. FIGS. 5 and 9 show a first and a second preferred embodiment of an air cushion made according to the method in the present invention. A hollow passageway connecting with ambient air may be attached to the air cushion during the process of extruding, blowing and shaping film 1 for attaching an air valve to the cushion. As also seen in FIGS. 8 and 12, holes may be provided in the ribs 11 to permit fluid communication between the cells 12 when the air cushion is inflated through the air valve.

As can be realized from the above detailed description, this invention has the following advantages.

1. The hollow material film with ribs is formed into an air cushion having a 3D cell structure and smooth upper and lower exterior surfaces by means of an air needle having one or more air holes.
2. A 3D hollow air cushion produced according to the invention has smooth upper and lower exterior surfaces so as to easily and closely fit into or engage an object.
3. It can produce smooth air cushions with internal ribs.
4. It can produce an air cushion having a smooth and shape memorizing structure, with very little surface transformation after inflation with a gas, and with excellent support function and smoothness of the exterior surfaces.
5. It can speed up production of air cushions having a better function than conventional cushions.

While the preferred embodiments of the invention have been described above, it will be recognized and understood that various modifications may be made thereto and the appended claims are intended to cover all such modifications which may fall within the spirit and scope of the invention.

What is claimed is:

1. A method of manufacturing an air cushion having smooth exterior surfaces comprising the steps of:
   a) extruding a film material through an extrusion mold to form an extruded hollow film defined by a first sheet, a second sheet and at least one rib disposed between the first and second sheets, the rib having a first edge secured to the first sheet and a second edge secured to the second sheet thereby dividing the hollow film into at least two internal cells;
   b) clamping the extruded hollow film in a shaping mold having a configuration of the air cushion;
   c) inserting a hollow needle having a plurality of injection holes into the extruded hollow film to dispose the injection holes in communication with the internal cells so that each cell is in fluid communication with an injection hole; and thereafter
   d) injecting a blowing substance through the injection holes and into each cell to blow the hollow film against the shaping mold and form the air cushion with smooth exterior surfaces.

2. The method of claim 1 wherein the extruded hollow film includes a plurality ribs forming a plurality of internal cells with the first and second sheets, and the hollow needle includes a plurality of injection holes so that there is an injection hole in communication with each cell.

3. The method of claim 2 further including the step of forming a hole in at least one rib to provide fluid communication between two adjacent cells.

4. The method of claim 2 wherein the ribs all extend in the same direction.

5. The method of claim 2 wherein at least some of the ribs extend in different directions.

6. The method of claim 1 further including the step of forming an air passageway in the air cushion for attaching an air valve to the cushion.

7. The method of claim 1 wherein the blowing substance is a fluid.

8. The method of claim 7 wherein the fluid is a gas or a liquid.

* * * * *